United States Patent [19]
Watanuki et al.

[11] Patent Number: 6,111,630
[45] Date of Patent: Aug. 29, 2000

[54] LIQUID CRYSTAL PROJECTOR HAVING A COOLER AND AN AIR VELOCITY SENSOR

[75] Inventors: Kiyoshi Watanuki; Mitsugi Kojima; Sousuke Hisamatsu; Kouichi Yamamoto, all of Yokohama, Japan

[73] Assignees: Hitachi, Ltd., Tokyo; Hitachi Video and Information Systems, Inc., Kanagawa-ken, both of Japan

[21] Appl. No.: 09/127,959

[22] Filed: Aug. 3, 1998

[30] Foreign Application Priority Data

Sep. 1, 1997 [JP] Japan .................................... 9-235935

[51] Int. Cl.$^7$ .......................... G02F 1/1333; H04N 5/74; G03B 21/16; G03B 21/18
[52] U.S. Cl. .............................. 349/161; 348/748; 353/52; 353/57
[58] Field of Search ............................... 349/161; 353/52, 353/57, 61; 348/748

[56] References Cited

U.S. PATENT DOCUMENTS 5,136,397  8/1992  Miyashita ................................... 353/57
5,682,216  10/1997  Lin et al. ................................. 349/161

FOREIGN PATENT DOCUMENTS 4-271334  9/1992  Japan ..................................... 349/161

OTHER PUBLICATIONS

IBM Technical Disclosure Bulletin, vol. 29, No. 9, Feb. 1987, pp. 3930–3931, "Cooling Projection System for Passive Display", Feb. 1997.

*Primary Examiner*—Walter Malinowski
*Attorney, Agent, or Firm*—Antonelli, Terry, Stout & Kraus, LLP

[57] ABSTRACT

A liquid crystal projector, comprising: a liquid crystal panel; a light source for irradiating light onto an image formed on the a liquid crystal panel; a projection lens for enlarging and projecting the image projected from the liquid crystal panel; a cooler, such as a suction fan, for sending cooling air flow onto a panel surface of the liquid crystal panel; an air velocity sensor for sensing air velocity of the cooling air flow sent onto the liquid crystal panel; and a protection device for protecting the liquid crystal panel on a basis of a detected value of the air velocity measured by the air velocity sensor. The is further formed an air passage for passing the cooling air flow along with the panel surface of the liquid crystal panel, and the air velocity sensor is positioned in an exit portion of the cooling air flow passing through the liquid crystal panel.

3 Claims, 3 Drawing Sheets

LIQUID CRYSTAL PROJECTOR HAVING A COOLER AND AN AIR VELOCITY SENSOR

BACKGROUND OF THE INVENTION

1. Field of the Invention

The present invention relates to a liquid crystal projector, in particular, to that in which is applied to a technology for protecting a liquid crystal panel from an increase in the temperature thereof.

2. Description of Prior Art

Conventionally, it is common that a liquid crystal projector is heated by light irradiated for projecting an image of a liquid crystal panel, thereby increasing the temperature thereof. For suppressing the increase in the temperature, cooling air is sent onto the liquid crystal panel by means of a fan. Thereby, generation of deformation in the liquid crystal panel, etc., due to the increase of the temperature is prevented.

Such protection technology of the liquid crystal panel is already disclosed and known by, for example, Japanese Patent Laying-Open No. Hei 4-60533 (1992) and Japanese Patent Laying-Open No. Hei 4-60534 (1992). In Japanese Patent Laying-Open No. Hei 4-60533, it is constructed by comprising a detection means of surrounding temperature which is positioned in the vicinity of the liquid crystal panel, a wind velocity detection means (or sensor) for detecting wind velocity of the cooling air at an incident side with respect to the liquid crystal panel, and a means for detecting the lamp energy of a light source. An output of the surrounding temperature detection means is sent a micro-computer, thereby if the output which is sent to is higher than a preset upper limit value, then it turns OFF an electric power source, and if it is lower than that an information is sent to a control circuit. Also, the output of the wind velocity detection means is sent to the micro-computer, thereby if the wind velocity is less than a preset value due to clog in a filter, etc., then it turns OFF the electric power source, and if it is greater than the preset value, an information is sent to the control circuit. Furthermore, an output of the means for detecting the lamp energy is also sent to the micro-computer, thereby if the energy is less than a preset value, it indicates an exchange of the lamp, and if it is greater than the preset value, an information is sent to the control circuit. On a basis of the information of the surrounding temperature of the panel, of the wind velocity at the incident side, and of the lamp energy, which are sent to the control circuit, the revolution numbers of a suction fan and an exhaustion fan are controlled so that the temperature of the liquid crystal panel is less than a predetermined constant value.

With the conventional art mentioned in the above, the wind velocity sensor is positioned at a downstream side of an air flow of the cooling air passing through the liquid crystal panel and the exhaustion fan is positioned at a rear side of the liquid crystal panel, therefore causing following problems. For instance, if the clog or the like is caused in a suction system including the suction fan due to any reason, the cooling air by the suction fan is reduced down in the amount of wind as well as in the velocity thereof, however, due to an affect of the air flow formed by the exhaustion fan, the wind velocity which is detected by the wind velocity sensor will not decrease down greatly, therefore it is likely to fail to detect the decrease in the wind amount by the suction fan so that the temperature of the liquid crystal panel rises up.

SUMMARY OF THE INVENTION

An object of the present invention is, therefore, for overcoming the problems in the above-mentioned conventional art, to provide a liquid crystal projector equipped with a technology for suppressing the increase of the temperature in the liquid crystal panel.

For achieving the above-mentioned object, in accordance with the present invention, there is provided a liquid crystal projector, comprising:

a liquid crystal panel;

a light source for irradiating light onto an image formed on said a liquid crystal panel;

a projection lens for enlarging and projecting the image projected from said liquid crystal panel;

cooling means for sending cooling air flow onto a panel surface of said liquid crystal panel;

a wind velocity sensor for sensing wind velocity of the cooling air flow sent onto said liquid crystal panel; and a protection device for protecting said liquid crystal panel on a basis of a detected value of the wind velocity measured by said wind velocity sensor, wherein there is further formed an air passage for passing the cooling air flow along with the panel surface of said liquid crystal panel, and said wind velocity sensor is positioned in an exit portion of the cooling air flow passing through said liquid crystal panel.

With provision of said wind velocity sensor positioned in the exit portion of the cooling air flow, it is possible to measure the amount of the air supplied to the liquid crystal panel from said cooling means suitably without the affect of said exhaust fan, etc. Therefore, even in a case that the amount of the cooling air flow supplied from said cooling is reduced due to the clog and the like, it is possible to protect the liquid crystal panel appropriately. In this case, it is preferable to construct said wind velocity sensor, for example, by comprising a heat generating body, a temperature sensing element which changes electric characteristics thereof in response to a surrounding temperature, and a temperature sensor for measuring a temperature of the cooling air, thereby said wind velocity sensor detecting the wind velocity of the cooling air flow on a basis of the change in the electric characteristics of said temperature sensing element and compensating the detected value by the temperature of the cooling air flow which is detected by said temperature sensor. Namely, since the detection of the wind velocity by means of said heat generating body and said temperature sensing element receives an influence from the temperature of the cooling gaseous body as a target to be measured, it is possible to measure the wind velocity which is near to a true value by removing that influence therefrom.

Further, in a case where said liquid crystal panel comprises three liquid crystal panels for three colors of red, green and blue, which are positioned opposing to three surfaces of a prism of a cubic shape, respectively, it is preferable to position said wind velocity sensor between said liquid crystal panels and said prism so as to fully remove the affect of the air flow by said exhaust fan.

DETAILED DESCRIPTION OF PREFERRED EMBODIMENTS

Hereinafter, embodiments of a liquid crystal projector according to the present invention will be fully explained by referring to the attached drawings.

Figure 1:
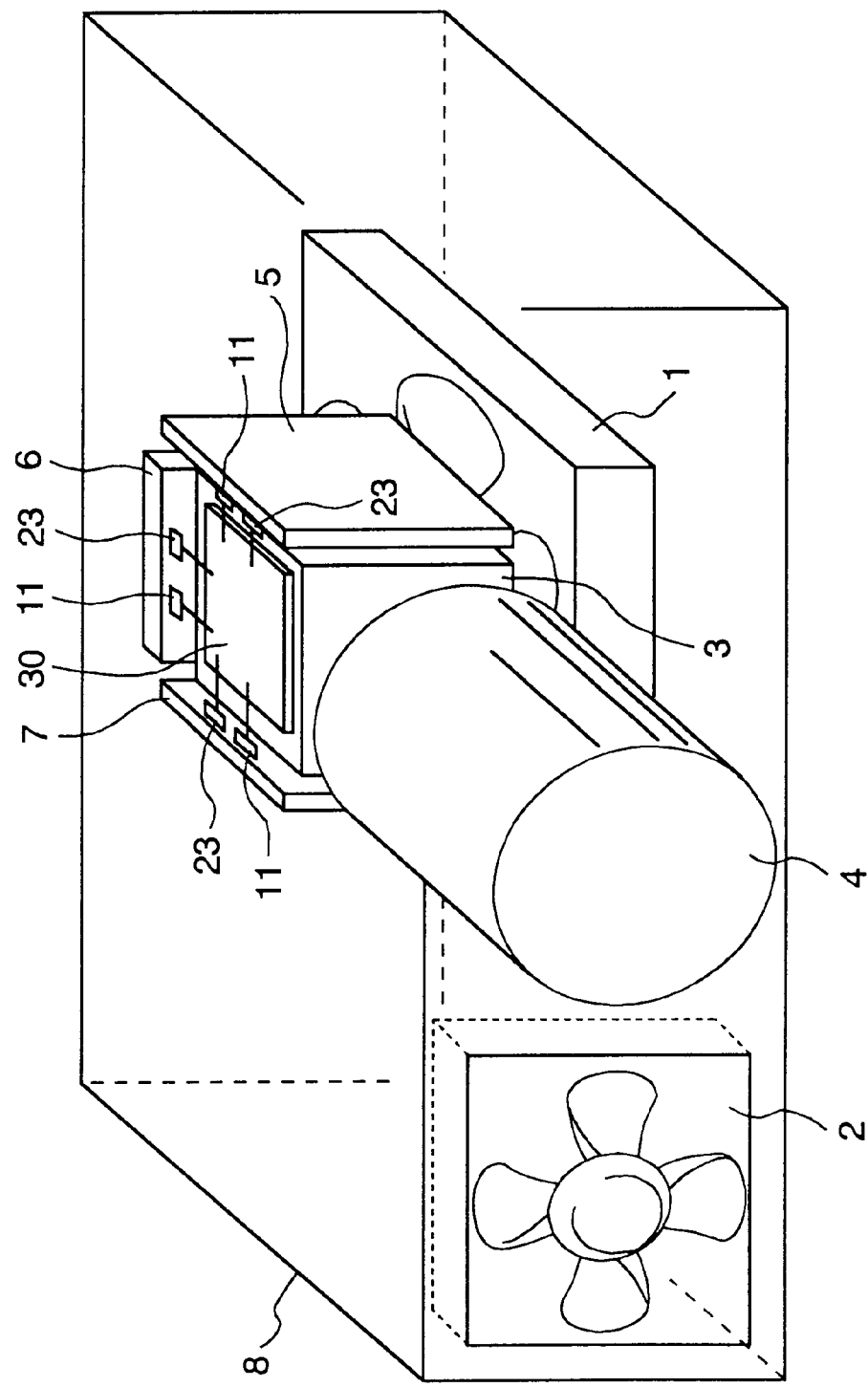
FIG. 1 is a view of showing an embodiment of a liquid crystal projector in accordance with the present invention.
Figure 2:
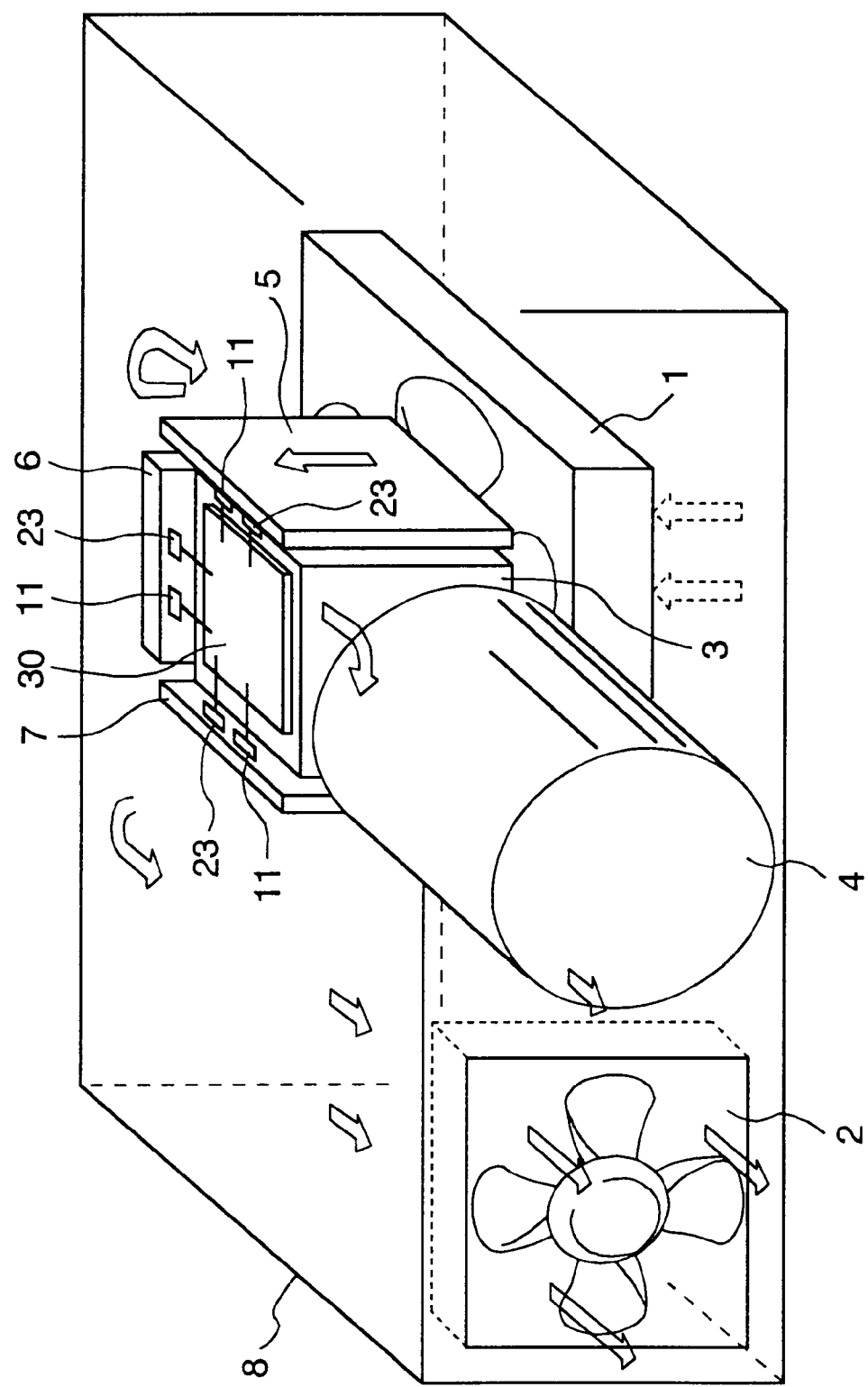
FIG. 2 is a view of showing flow of winds within inside of the liquid crystal projector shown in FIG. 2.

FIG. 1 is a view of showing an embodiment of a liquid crystal projector in accordance with the present invention; and FIG. 2 is a view of showing flow of winds within inside of the liquid crystal projector shown in FIG. 2.

In FIG. 1, the liquid crystal projector comprises a cooling means, such as a suction fan 1, for sending cooling air to liquid crystal panels, an exhaust fan 2 for exhausting the air within a cabinet 8 to outside, a light composition prism 3 for composing or combining three colors of lights being emitted from three liquid crystal panels, which will be explained later, a projection lens 4 for enlarging and projecting images formed on the three liquid crystal panels, a liquid crystal panel 5 for a red color, a liquid crystal panel 6 for a green color, a liquid crystal panel 7 for a blue color, and a cabinet 8, wherein a protection device 30 is provided on an upper surface of the light composing prism 3. Further, though not shown in the figure, a light source is provided in a space behind the exhaust fan 2, and the light rays ejected from it are irradiated onto the liquid crystal panels 5, 6 and 7. The light rays emitted from the liquid crystal panels 5, 6 and 7 are composed or combined through the prism 3 to form an image, so as to be enlarged and projected onto a screen by means of the projection lens 4.

Figure 3:
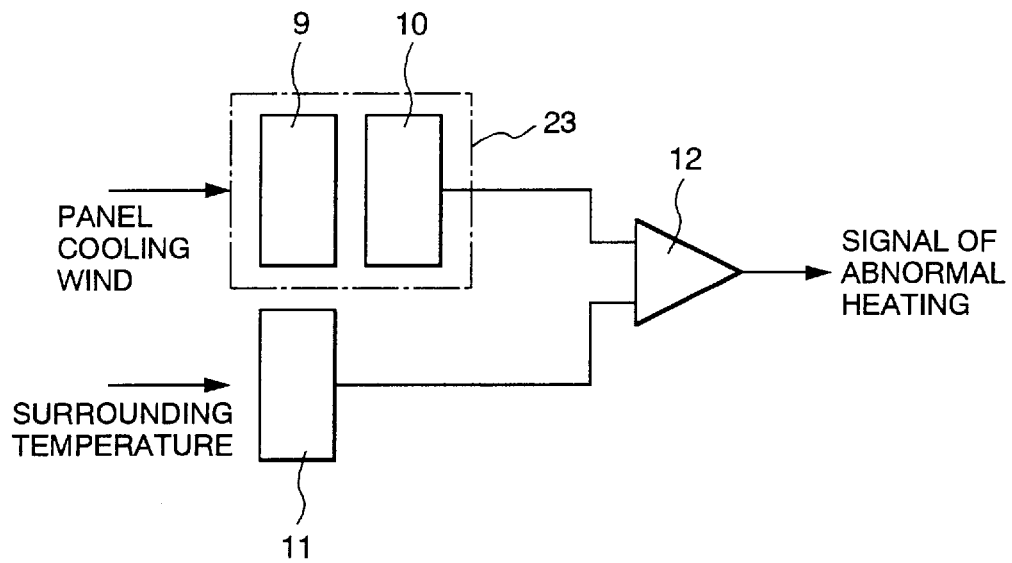
FIG. 3 is a circuit diagram of showing a construction of main portions of a protection portion in accordance with the present invention.

The protection device 30 is formed by a print board, the main portion of which is constructed by comprising, as shown in FIG. 3, a main body of a wind velocity sensor 23 which is made of a heat generating body 9 and a temperature sensitive element 10 which is positioned in the vicinity of the heat generating body 9, a temperature sensor 11 for measuring a surrounding temperature, and a comparator 12 for subtracting an output of the temperature sensor 11 from an output of the temperature sensitive element 10. And, the heat generating body 9 is heated by a constant amount of heat, while the temperature sensitive element 10 changes electric characteristics depending on the temperature of the heat generating body 9, therefore, the temperature sensitive element 10 provides an output of a detection value by detecting the substantial temperature of the heat generating body 9. Further, the temperature sensor 11 detects the temperature of a cooling air flowing around the heat generating body 9. And then, the main body of the wind velocity sensor 23 and the temperature sensor 11 are provided projecting into a space which is formed by those liquid crystal panels 5, 6 and 7 and the light composing prism 3. However, those can be provided on a side surface of the protection device 30 without projecting them.

The cooling air flows which are made by the fans of the liquid crystal projector being constructed in such manner are as shown in FIG. 2. Namely, the air sucked by the suction fan 1 flows through a gap between the liquid crystal panels 5, 6 and 7 and the light composition prism 3, as well as along with outer surfaces of the liquid crystal panels 5, 6 and 7, and hits upon a ceiling plate of the cabinet 8 to be changed into a lateral flow, so that it is exhausted by the exhaust fan 2 after passing inside of the cabinet 8.

An operation of the protection device 30 will be explained hereinafter. In a case that the cooling air is supplied by the suction fan 1 regularly, the temperature of the heat generating body 9 decreases in relation to the wind velocity of the cooling air. Since the decrease in the temperature of the heat generating body 9 appears as the change in electric characteristics (for example, a resistance value) of temperature sensitive element 10, therefore, it is possible to detect the wind velocity by the detection thereof. In this case, the change in the temperature of the heat generating body 9 due to the wind velocity is effected by the temperature of the cooling air, i.e., the surrounding temperature. Then, in accordance with the present embodiment, the surrounding temperature is detected by the temperature sensor 11, with the detection value of which is compensated the detection value of the temperature sensitive element 10 so as to detect the wind velocity with high accuracy. The comparator 12 subtracts the detection value of the surrounding temperature from the detection value of the wind velocity, and if the difference is higher than a preset reference value, it outputs a signal of abnormal heating. Thereby, the protection device provides an instruction of turning OFF the electric power source of a set of the projector or the light source thereof, or it indicates a warning of the abnormal heating.

For an instance, assuming that a piece of paper is sucked by and stuck on the suction fan 1 and the amount of wind by suction is reduced, the air enters into from the gap of the cabinet 8 and so on due to sucking function by the exhaust fan 2. The air flow around the liquid crystal panels 5, 6 and 7 are mainly of the lateral flows of wind, therefore the air flow along with the panel surfaces of the liquid crystal panels 5, 6 and 7 becomes very small in the amount thereof. As a result of this, the wind velocity of the cooling air around the heat generating body 9 is reduced, while the temperature of the heat generating body 9 is increased. The detection value being outputted from the temperature sensitive element 10 rises up, then the signal of the abnormal heating is outputted from the comparator 12.

Namely, according to the embodiment shown in FIG. 1, since the main body 23 of the wind velocity sensor is provided at the position just after where the cooling air by the suction fan 1 as the cooling means passes through the liquid crystal panel portions, it is possible to detect only the wind velocity of the air flow which is actually effective for cooling the liquid crystal panels, thereby protecting the liquid crystal panels with certainty. Here, as shown in FIG. 1, it is preferable to position the upper edges of the liquid crystal panels 5, 6 and 7 higher than the upper surface of the light composition prism 3, thereby forming a hollow portion being surrounded therewith, for preventing the main body 23 of the wind velocity sensor from being exposed to the lateral wind. In the case, if the main body 23 of the wind velocity sensor is positioned at the side surface of the protection device 30, it is possible to reduce the influence of the lateral wind due to the exhaust fan 2.

Figure 4:
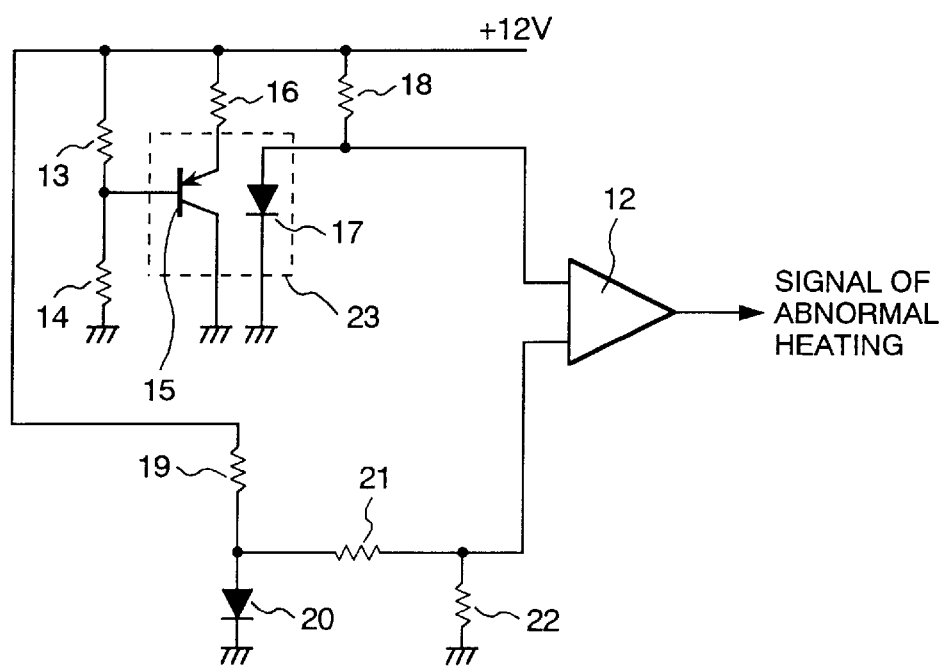
FIG. 4 is a circuit diagram of showing the concrete embodiment of the main portions of the protection portion in accordance with the present invention.

In FIG. 4, there is shown a concrete circuit of the construction shown in FIG. 3. In FIG. 4, a transistor 15 corresponds to the heat generating body 9, wherein an emitter of the transistor 15 is connected through a resistor 16 to the electric power source, a base thereof is connected to a juncture of resistors 13 and 14 which are connected in series between the electric power source and ground, and a collector thereof is connected to ground. A diode 17, corresponding to the temperature sensitive element 10, has a cathode which is connected to ground, and an anode of which is connected through a resistor 18 to the electric power source with attaching to the transistor 15. A diode 20 corresponds to the temperature sensor 11 and the same kind of the diode 17 is used for it. The cathode of the diode 20 is connected to ground, and the anode thereof is connected through a resistor 19 to the electric power source, as well as to ground through resistors 21 and 22. A comparator 12 provides an output by subtracting from a value of a bias voltage of forward direction of the diode 17 a value at the juncture between the resistors 21 and 22 which divide and adjust the bias voltage of forward direction of the diode 20.

An operation of the embodiment shown in FIG. 4 will be explained hereinafter.

An emitter current of the transistor 15 comes to be determined by the resistors 13 and 14 and the emitter resistor 16. The transistor 15 generates the heat depending on an electric power consumption which is determined by a product between the emitter current and the collector-emitter voltage thereof. The bias voltage in the forward direction of the diode 17 has a thermal coefficient of $-2$ mV/C°. Since the diode 17 is provided attaching to the transistor 15 which generates heat, the bias voltage of the diode 17 in the forward direction thereof changes on a basis of the change in the temperature of the transistor 15 corresponding to the heat generating body, thereby a voltage corresponding to this is inputted to the comparator 12. Further, the transistor 15 is cooled by wind blowing up vertically by the suction fan 1 as the cooling means, the temperature of which is decreased down, and the change in the temperature of the transistor 15 corresponds to the wind velocity, therefore, it is possible to detect the wind velocity by detecting the bias voltage of that transistor 17 in the forward direction.

Further, the diode 20 can also detect, in the same manner, the temperature of the air flow due to the suction fan 1 as the cooling means, i.e., the surrounding temperature of the transistor 15. And, the comparator 12 subtract the detection value of the surrounding temperature from the detection value of the temperature of the transistor 15 which corresponds to the wind velocity, thereby detecting only the change of the temperature in the transistor due to the wind velocity. If the difference between those two detection values is larger than the reference value, it decides that the wind velocity is small, then actuates an protection operation against the abnormal heat generation, i.e., at least either one of the warning indication of the abnormal heat generation or the turning OFF of the electric power source.

In this manner, according to the embodiment shown in FIG. 4, since the wind velocity sensor is constructed with those parts, such as the transistor, the resistors, the diodes and the IC, etc., which are commonly available on a market, it is possible to manufacture a highly practical liquid crystal projector equipped with a protection device, with a cheap price and flexibly meeting with specifications of a set thereof.

As is fully explained in the above, in accordance with the present invention, it is possible to provide a liquid crystal projector, in which the wind velocity or the flow amount of the cooling air can be measured appropriately with suppressing the effect by the air flow due to the exhaust fan.

The present invention can be practiced in other embodiments or forms without exceeding the sprits or main features thereof. Accordingly, the embodiment mentioned in the above is only one example of the present invention in all respects thereof, and it should not be interpreted restrictedly. Breadth of the present invention is indicated or defined by the pending claims. Further, various modifications and/or variations belonging to the equivalent of the pending claims are all inside of the breadth of the present invention.

What is claimed is:

1. A liquid crystal projector, comprising:

a liquid crystal panel;

a light source for irradiating light onto an image formed on said liquid crystal panel;

a projection lens for enlarging and projecting the image projected from said liquid crystal panel;

a cooler for providing cooling air flow onto a panel surface of said liquid crystal panel;

an air velocity sensor for sensing air velocity of the cooling air flow sent onto said liquid crystal panel; and a protection device for protecting said liquid crystal panel on a basis of a detected value of the air velocity measured by said air velocity sensor, wherein there is further formed an air passage for passing the cooling air flow along with the panel surface of said liquid crystal panel, and said air velocity sensor is positioned in an exit portion of the cooling air flow passing through said liquid crystal panel.

2. A liquid crystal projector as defined in claim 1, wherein said air velocity sensor comprises a heat generating body, a temperature sensing element which changes electric characteristics thereof in response to a surrounding temperature, and a temperature sensor for measuring a temperature of the cooling air, whereby said air velocity sensor detecting the air velocity of the cooling air flow on basis of the change in the electric characteristics of said temperature sensing element and compensating the detected value by the temperature of the cooling air flow which is detected by said temperature sensor.

3. A liquid crystal projector as defined in claim 2, wherein said liquid crystal panel comprises three liquid crystal panels for three colors of red, green and blue, which are positioned opposing to three surfaces of a prism of a cubic shape, respectively, and said air velocity sensor is positioned between said liquid crystal panel and said prism.

* * * * *